Oct. 15, 1963     D. G. CHAKIRIS     3,106,981
ELECTRONIC DRIVING ASSURANCE SYSTEM
Filed April 3, 1961     2 Sheets-Sheet 1
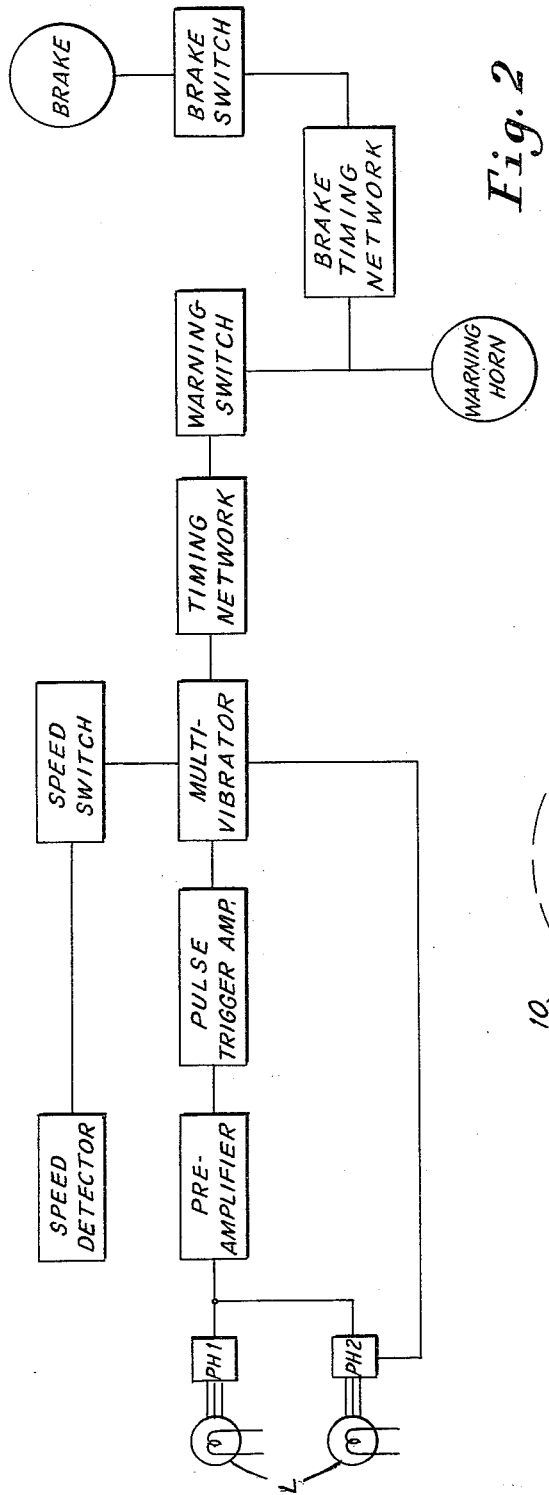
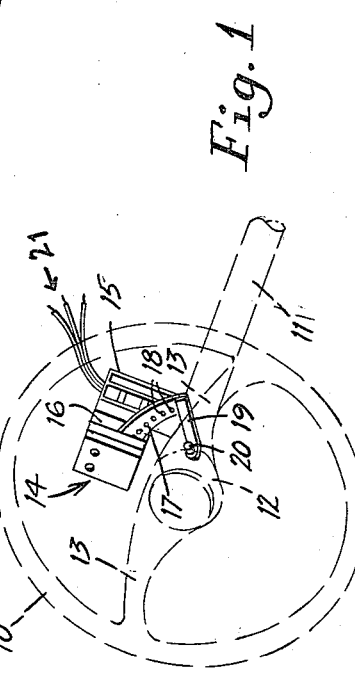
INVENTOR
DEMETRIUS G. CHAKIRIS,
BY *Irwin V. Glenn*
ATTORNEY Oct. 15, 1963   D. G. CHAKIRIS   3,106,981
ELECTRONIC DRIVING ASSURANCE SYSTEM
Filed April 3, 1961   2 Sheets-Sheet 2

INVENTOR
DEMETRIUS G. CHAKIRIS,
BY
ATTORNEY

United States Patent Office 3,106,981
Patented Oct. 15, 1963

3,106,981
ELECTRONIC DRIVING ASSURANCE SYSTEM
Demetrius G. Chakiris, Dayton, Ohio, assignor to Metro-Mac, Inc., Dayton, Ohio, a corporation of Ohio
Filed Apr. 3, 1961, Ser. No. 100,371
12 Claims. (Cl. 180—82)

This invention relates to a novel electronic driving assurance system.

Generally, the system utilizes for its operation the absence of the constant slight oscillatory movement of the steering wheel of an automotive vehicle required to maintain the moving vehicle aligned with the road. By a very simple and rugged detector device having but one moving part, for example, a perforated shield not subjected to stresses or wearing friction, and photoelectric means controlled thereby, electrical pulses are generated. The electrical pulses are amplified by an all transistor system including a first timing network that operates a warning signal when steering motions cease as a result of incapacitation of the vehicle driver for a dangerous period of time. A second timing network coupled to the warning network is designed to automatically apply the vehicle brakes if steering motions are not resumed within a safely short period after the warning signal is energized.

The system also includes a vehicle-speed-responsive device and a sharp-turn-responsive branch circuit to prevent undesirable operation of the system by abnormally slow speeds and/or unusually sharp turns, the latter interrupting the light pulses as will hereinafter appear.

While it has been heretofore proposed to utilize the oscillations of the steering wheel during normal driving to inhibit a warning system that automatically operates when the oscillations cease, such suggested apparatus is complicated, costly and subject to failure caused by wear or breakage of the moving parts thereof.

It is accordingly a principal object of this invention to provide a combined alarm and brake-applying system responsive to cessation of steering wheel oscillations, which system is primarily electronic.

It is another object of the invention to provide such an apparatus utilizing transistors for all of the amplifier and relay devices, for greater durability and reliability.

It is a further object to provide apparatus of the type disclosed in which the mechanical parts thereof are reduced to a minimum and contain no rubbing parts subject to failure due to wear.

It is the overall object of this invention to generally improve the efficiency and reliability of a safety system of the type disclosed.

Other and further objects of the invention will become apparent from a reading of the following specification taken in conjunction with the drawings, in which:

FIGURE 1 is a perspective view of the steering detector part of the system;

FIGURE 2 is a block diagram schematically showing the functional interrelations of the several parts of the system.

Figure 3:
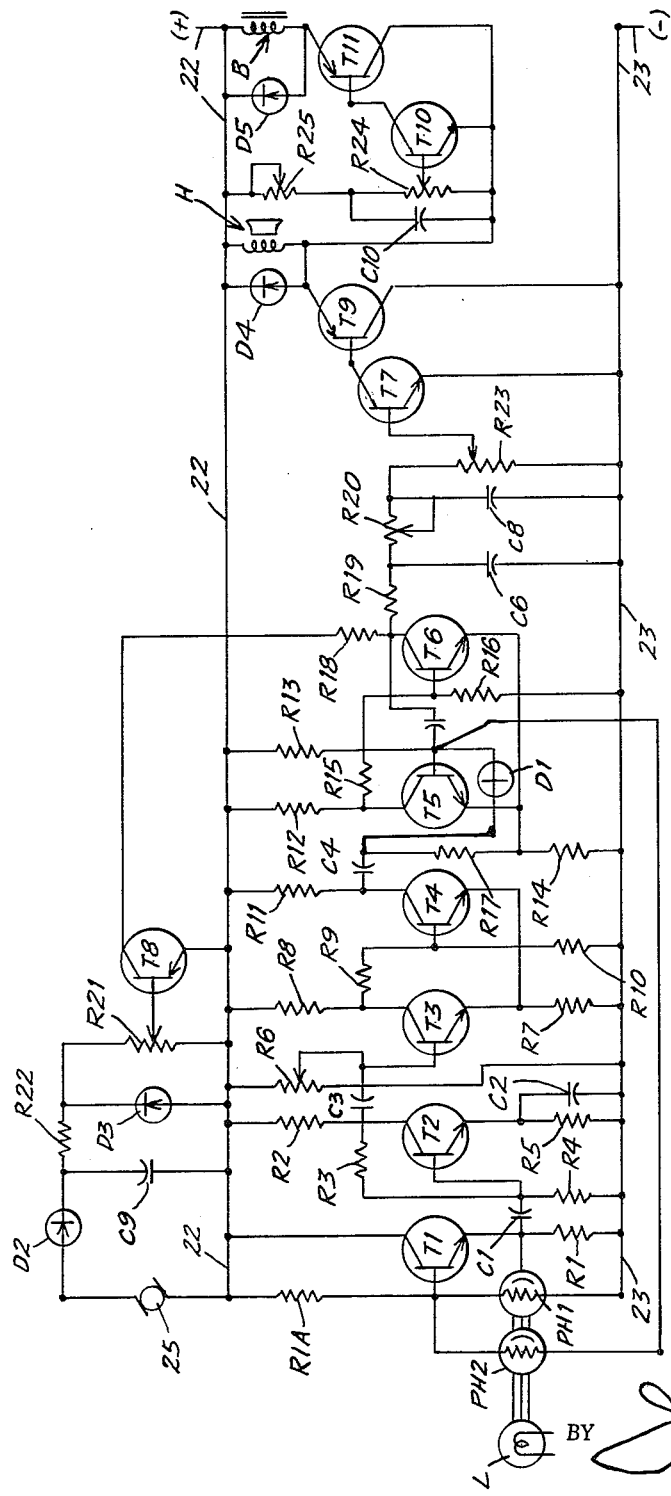
FIGURE 3 is a wiring diagram of the electronic circuitry of the system.

With reference to the drawings, numeral 10 designates a conventional steering wheel for an automotive vehicle. Wheel 10 is mounted on a steering post 11 and has a hub portion 12 and connecting spokes 13.

Numeral 14 generally designates a housing for the photoelectric parts of the apparatus. Housing 14 is mounted on a bracket 15 connectable by any suitable clamp or other structure, not shown, to steering post 11. Housing 14 is split transversely and medially to define a channel 16 through which the arcuate light shield 17 passes as the steering wheel rotates or oscillates and to which it is fastened by arm 19 and screw 20. The two halves of the housing 14 are rigidly interconnected by conventional means (not shown) located radially beyond the periphery of the arcuate light shield 17.

Shield 17 has any desired arcuate extent, such as for example 20°, which allows 10° on each side of the normal or zero position of steering wheel 10. Shield 17 has two parallel concentric tracks, the inner one of which contains the row of apertures 18 and the outer one which is imperforate. Thus the inner track has areas (the apertures) having a first physical characteristic (high light transmissivity) interlaced with areas between the apertures having a second physical characteristic (opacity or zero light transmissivity) differing from the first characteristic in degree. The outer track is constant in its physical characteristic of opacity.

A lamp, or lamps, L, FIGURE 2, is located in the housing 14 on one side of the shield-spanning slot 16, and the two photoelectric cells PH1 and PH2 are located on the other side thereof, the lamp or lamps and the cells being supported in the housing by conventional structures (not shown). Cell PH1 is located so as to receive light beamed toward the same in pulses through apertures 18 as the shield is oscillated during normal steering while cell PH2 receives light beamed toward the same only when the steering wheel is turned more than 10° from zero position to swing shield 17 completely out of shielding position between lamp L and photoelectric cells. Leads 21 connect the photoelectric cells and lamp L, respectively, to the electronic apparatus and to a source of power.

With reference to FIGURE 3, the steering-responsive photoelectric cell PH1 and resistor R1A are connected in series across the power input leads 22(plus) and 23(minus), to constitute a voltage divider and provide the variable bias voltage for the base of transistor T1, since photoelectric cell PH1, being of the photo-conductive type, changes resistance inversely proportionally to the light intensity.

The on-off light beam through apertures 18 thus produces a pulse-type signal that is amplified by transistor T1, the output appearing at the emitter thereof across resistor R1 for coupling through capacitor C1 to the second amplifier transistor T2. The amplified output from transistor T2 is coupled by capacitor C3 to a trigger circuit comprising transistors T3 and T4. The trigger circuit converts the signal from the steering-detecting photocell PH1 to pulses, the negative phases of which trigger the multivibrator T5 and T6. The sensitivity of the trigger circuit is controlled to the potentiometer R6.

When pulses are received from the trigger circuit, transistor T5 of the multivibrator remains in the "off" state while transistor T6 is in the "on" condition. Resistors R19, R20 and R23 and capacitors C6 and C8 comprise the "warning" timing network, which is shunted by the transistor T6 in its "on" state, corresponding to normal driving conditions, and thus is prevented from becoming charged sufficiently to operate transistor T7.

Upon incapacitation of the driver, however, no pulse signals are transmitted to the multivibrator, thus causing transistor T5 to conduct and transistor T6 to be "off." This opens the shunt circuit across the warning timing network permitting it to charge up to a potential sufficient to bias the base of transistor T7 to a conducting value.

Conducting transistor T7 biases the base of a power transistor T9 to a conducting potential and the latter operates the warning signal H, which can be the vehicle horn, and simultaneously begins charging the brake timing network. The brake timing network comprises a capacitor C10 and resistors R25 and R24. When said brake timing network becomes sufficiently charged to render the transistor T10 conductive, this in turn biases the base of transistor T11 and the latter energizes the brake-applying solenoid B to stop the vehicle automatically.

In order to prevent undesirable energization of the warning signal and/or automatic application of the brakes when the vehicle is stopped or is moving too slowly, a small A.C. generator 25 is employed and is coupled, for example, to the speedometer cable of the vehicle by any suitable means, not shown, which generator supplies in relation to speed a current, which can be preset to a value sufficiently low to prevent transistor T8 which acts as a switch from operating, thus turning off the warning-timing network.

The output from generator 25 is rectified by a diode D2 and the resulting pulsating D.C. voltage is impressed on the base of a transistor T8 to which it is coupled by resistor R22 and a potentiometer R21, the latter providing means for varying the minimum speed at which the speed-responsive network will effect its inhibiting action. The diode D3 is a Zener diode employed to prevent excess voltage, at high vehicle speeds, from damaging transistor T8.

The rectified D.C. signal supplies the bias to transistor T8 switching current from voltage supply 22 and is coupled to resistor R18 to the collector of transistor T6 of the multivibrator so as to maintain the latter in its "on" or inhibiting state at vehicle speeds below the selected minimum whether or not steering-responsive pulses are being fed thereto.

A further refinement for preventing undesirable operation of the system during such sharp turning of the vehicle as would remove shield 17 from its position within housing 14, comprises a second photoelectric cell PH2 coupled to the base of transistor T5 of the multivibrator. This turn-detecting cell so coupled produces a regenerative circuit that generates electric oscillatory pulses having the same inhibiting effect on the system as the pulses generated by the steering-responsive photocell PH1.

Variable resistor R20 is the control varying the time delay for the warning signal. Resistor R23 is a semi-adjustable resistor for setting the fixed bias of transistor T7. Resistor R25 is a variable resistor for adjusting the time delay for the automatic braking operation. Resistor R24 is a semi-adjustable resistor for varying the fixed bias of transistor T10.

The operation of the system is illustrated by the block diagram of FIGURE 2. During normal steering of the vehicle, the steering wheel, FIGURE 1, is oscillated sufficiently, in keeping the vehicle aligned with the road, to cause light from lamp L to reach photocell PH1 in pulses which are translated into electric pulse signals. The electric pulse signals are fed to the preamplifier, thence to the pulse trigger amplifier and from the latter to the multivibrator, which during such normal driving, shunts the timing network, as described above, to inhibit the warning and braking networks.

If the driver of a vehicle having a device of this invention, becomes drowsy or is otherwise incapacitated, the electrical pulses cease. This permits the timing network to become charged during a preselected, safely short, period of time, at the end of which the warning switch, transistor T9, closes a circuit to the warning horn and simultaneously begins charging the brake timing network. After a preselected, safely short, period of time, the brake timing network becomes charged sufficiently to close the brake switch, power transistor T11, to energize the brake-applying solenoid B.

To prevent operation of the system at very low speeds, the speed detector, generator 25, acts on the speed switch, transistor T8, to inhibit undesired operation of the multivibrator.

To prevent undesirable operation of the system during sharp turns, photocell PH2 when uncovered by movement of the imperforate track part of arcuate shield 17 out of shield position thereover, receives light from lamp L and becomes conductive to regeneratively couple the vibrator back to the preamplifier. This generates electric oscillations which produce the same inhibiting effects produced by the intermittently irradiated photocell PH1 during normal driving.

While but one form of the invention has been shown and described herein, it is obvious that other modifications and/or equivalents may be employed without departing from the scope of the invention, which is defined in the appended claims.

What is claimed is:

1. Safety apparatus for a vehicle having a steering wheel, comprising an arcuate element having a longitudinally extending track defined by a first series of spaced portions having a first physical characteristic interlaced with a second series of spaced portions having a second physical characteristic differing from said first characteristic primarily in degree, means for fixing said arcuate element to said steering wheel concentrically thereof, electronic means constructed and positioned so as to produce electrical pulses in response to steering movements of said arcuate element relative thereto, electronic circuit means coupled to said electronic means and including a series of transistors interconnected as amplifying and switching elements and a capacitive timing network, and a circuit-making device controlled by said timing network for energizing a warning signal when a preselected time period has elapsed after substantial cessation of steering wheel movements.

2. Apparatus according to claim 1 additionally comprising power operated brakes for said vehicle, a second capacitive timing network coupled to said circuit-making device so as to begin charging simultaneously with energization of said warning signal, and electrically operated means controlled by said second timing network for automatically applying the brakes of said vehicle when a preselected time period has elapsed after energization of said warning signal.

3. Apparatus according to claim 1 additionally comprising a pulse-output electric generator, driving means for said generator, said driving means being coupled to the driving mechanism of said vehicle so as to have a speed of operation corresponding to the speed of said vehicle, and auxiliary electronic circuit means coupling said first electronic circuit means to the output terminals of said electric generator so as to inhibit operation of said system when the frequency of said electrical pulses falls sufficiently, due to reduced vehicle speed, to otherwise cause undesired operation of said warning signal.

4. Apparatus according to claim 1, said arcuate element having a second track thereon parallel to said first track, said second track being longitudinally constant in the said characteristic that varies along said first track, and a second electronic means normally positioned adjacent and operable by removal of said second track for regeneratively coupling separated portions of said first electronic circuit means to generate therein oscillations having the same inhibiting effect on said first electronic circuit means as said pulses from said first electronic means, thereby preventing undesired operation of said system due to such extreme turning movements of said steering wheel as would move and hold said tracks away from normal driving positions thereof relative to their respective electronic means.

5. Apparatus according to claim 1, said warning signal being a power operated horn constituting an accessory part of said vehicle.

6. Apparatus according to claim 1, said first track being defined by a series of spaced holes and said electronic means being a photoelectric unit.

7. Safety apparatus for a vehicle having a steering wheel, comprising an arcuate element having a longitudinally extending track defined by a first series of spaced portions highly transmissive of light interlaced with a second series of spaced portions relatively non-transmissive of light, means for fixing said arcuate element to said steering wheel concentrically thereof, a light source adjacent said arcuate element, photoelectric means constructed and positioned so as to produce electrical pulses in response to steering movements of said arcuate element relative thereto, electric circuit means coupled to said photoelectric means and including a series of transistors interconnected as amplifying and switching elements and a capacitive timing network, and a circuit-making device controlled by said timing network for energizing a warning signal when a preselected time period has elapsed after cessation of steering wheel movements.

8. Apparatus according to claim 7 additionally comprising power operated brakes for said vehicle, a second capacitive timing network coupled to said circuit-making device so as to begin charging simultaneously with energization of said warning signal, and electrically operated means controlled by said second timing network for automatically applying the brakes of said vehicle when a preselected time period has elapsed after energization of said warning signal.

9. Apparatus according to claim 7 additionally comprising a pulse-output electric generator, driving means for said generator, said driving means being coupled to the driving mechanism of said vehicle so as to have a speed of operation corresponding to the speed of said vehicle, and auxiliary electronic circuit means coupling said first electronic circuit means to the output terminals of said electric generator so as to inhibit operation of said system when the frequency of said electrical pulses falls sufficiently due to reduced vehicle speed to otherwise cause undesired operation of said warning signal.

10. Apparatus according to claim 7, said arcuate element having an arcuate extent not exceeding 180° and having a second track thereon parallel to said first track, said second track being constant in light absorptivity therealong, and a second photoelectric means positioned adjacent and operable by removal of said second track for regeneratively coupling separated portions of said first electronic circuit means to generate therein oscillations having the same inhibiting effect on said first electronic circuit means as said pulses from said first photoelectric means, thereby preventing undesired operation of said system due to such extreme turning movements of said steering wheel as would move and hold said tracks away from normal driving positions thereof relative to their respective photoelectric means.

11. Apparatus according to claim 7, said warning signal being a power operated horn constituting an accessory part of said vehicle.

12. Apparatus according to claim 7, said first track being defined by a series of spaced holes.

References Cited in the file of this patent

UNITED STATES PATENTS

| | | |
|---|---|---|
| 2,166,580 | Caldwell | July 18, 1939 |
| 2,187,761 | Torrens | Jan. 23, 1940 |
| 2,848,712 | Preston | Aug. 19, 1958 |
| 2,875,430 | Kayser | Feb. 24, 1959 |
| 2,888,668 | Colatriano | May 26, 1959 |
| 2,902,030 | Kennedy | Sept. 1, 1959 |